United States Patent [19]

McConnell et al.

[11] Patent Number: 5,526,477
[45] Date of Patent: Jun. 11, 1996

[54] SYSTEM AND METHOD FOR GENERATING GLYPHS OF UNKNOWN CHARACTERS

[75] Inventors: John I. McConnell, Menlo Park, Calif.; Mordehai Huberman, Ra'anana, Israel

[73] Assignee: Digital Equipment Corporation, Maynard, Mass.

[21] Appl. No.: 177,041

[22] Filed: Jan. 4, 1994

[51] Int. Cl.[6] .................................................. G06T 11/00
[52] U.S. Cl. ........................................ 395/150; 395/151
[58] Field of Search ................................ 395/150, 144, 395/151, 143; 364/419.16, 419.14; 345/26–27, 128–130, 141–144, 192–195

[56] References Cited

U.S. PATENT DOCUMENTS

| | | | |
|---|---|---|---|
| 4,730,269 | 3/1988 | Kucera | 364/900 |
| 4,761,761 | 8/1988 | Sekiguchi | 364/900 |
| 4,787,059 | 11/1988 | Yoshimura | 364/900 |

Primary Examiner—Heather R. Herndon
Assistant Examiner—Joseph H. Feild
Attorney, Agent, or Firm—Denis G. Maloney; Arthur W. Fisher

[57] ABSTRACT

A method and apparatus for generating glyphs for text elements input to a computer having a memory with at least one look-up table storing glyphs corresponding to such text elements. Each text element is made up of at least one code point, and often of several code points. The system searches the table for a glyph representing an input text element, and if it is not found methodically generates subsets of the text element and searches the table for glyphs representing each of the subsets. Default characters are generated for code points not represented in the table. The system uses a classification for each code point, such as the Unicode classifications, and handles unknown code points in a manner dependent upon their classification. Where a text element includes two characters with an intermediate joining character, and the text element as a whole is not represented in the table, the two characters are output for rendering separately. Where a text element includes combining characters and the combined text element as whole is not represented in the table, the system generates the characters separately and then combines them for rendering as a single glyph. Unknown combining characters are replaced by a code point for a blank combining character, for allowing any surrounding combining characters to be rendered in a combined fashion.

20 Claims, 6 Drawing Sheets

SYSTEM AND METHOD FOR GENERATING GLYPHS OF UNKNOWN CHARACTERS

BACKGROUND OF THE INVENTION

As the use of computers proliferates around the world, so that peoples representing the vast majority of languages now regularly produce documents and carry on international communication using their computers and work stations, it is becoming of ever increasing importance that the information passed among speakers of different languages be mutually compatible with printing and display systems for rendering those languages. An international standard has developed, which, though not yet comprehensive, already covers most of the written alphabets in the world; this standard is The Unicode Standard/Worldwide Character Encoding (Addison-Wesley, ISBN 0-201-56788-1). (Each of the publications discussed in this application is incorporated herein by reference.) Unicode provides an encoding for each letter, diacritic, tone mark, or other special character for the languages that it covers. Further information on Unicode may be found in G. Adams, Introduction to Unicode, Unicode Implementers Workshop (Aug. 6, 1992) by the institute for Advanced Professional Studies, Cambridge, Mass. and proceedings of the Unicode Consortium/Unicode Implementers Workshops (Unicode, Inc. and Taligent), particularly the following workshop proceedings: Non-spacing Marks, Unicode Implementers Workshop #2 (Merrimack, N. H.; Mar. 12–13, 1993); and M. Davis, Strategies for Handling Non-spacing Marks and T. Yamasaki, Unicode on Print Servers, both from Unicode Implementers Workshop #3 (San Jose, Calif.; Aug. 6–7, 1992).

Another coding system available is UniversalString or 10646String, which includes the Universal Character Set Code ISO/IEC 10646, as described in ISO/IEC International Standard 10646-1 (1993), prepared by the ISO and IEC Joint Technical Committee ISO/IEC JTC1 under the general title Information technology—Universal Multiple-Octet Coded Character Set (UCS) (1993). The 10646 code set is in large part similar to Unicode's, and the shortcomings of the 10646 system are similar to those of Unicode. The discussion in this application pertains to both these and other such encoding systems.

When a computer system interprets a string of Unicode, 10646 or otherwise encoded characters, it performs a rendering process to display or print those characters. Three conventional rendering procedures use a kerning table, a look-up table and a ligature table, either separately or in some combination. The input to the rendering system is a stream of code points (i.e., the binary-coded representations of the characters), and the output is a glyph code for each input character code. A glyph is a representation of a character in a single display or print cell, and may be a combination of several potentially independent characters; for instance, following are seven different glyphs:

a á ä ä̱

The last of these (ä̱) is represented by three code points: the code point for the "a", the code point for the umlaut, and the code point for underlining. In current systems, these three code points are combined and a single glyph is displayed.

When a look-up table is used, the rendering system compares the code point(s) with those in the table; if the particular code point combination is found, then the output is simply the glyph found at that entry of the look-up table.

The rendering system may additionally check a ligature table, to form ligatures of particular combinations of letters. Many languages (such as Arabic) have quite a few ligatures; English has only a few ligatures, such as fi for "fi", " ffi" for "ffi", and " fl" for "fl". These ligatures in English are optional, while in other alphabets, the ligatures are a required feature of the written language. An analysis of computer treatment of rendering Arabic ligatures and similar problems is found in J. Becker, Multilingual Word Processing, Scientific American, July 1984 and in J. Becker, Arabic Word Processing, Communications of the ACM, July 1987 (vol. 30, number 7).

The rendering system may also check a kerning table, where it determines the separation of particular combinations of glyphs, i.e. the separation between characters as displayed or printed.

The above three systems can be used in combination to accommodate many languages. Latin-based alphabets are particularly simple to handle. However, many languages have complicated rules about combining letters, tone marks and other characters with one another, which are not well suited to these approaches.

Kerning and ligature tables are in most systems rather small, and unable to accommodate the thousands of possible combinations of characters that must be represented for even a single language; for instance, Thai has some 2700 possible character combinations, which would make a look-up table, a ligature table or a kerning table unacceptably large, and would occupy too much processor time to check each combination.

Similarly, Arabic letters can be combined in at least three different ways, having initial, medial and final forms, and others additionally have a fourth (isolated) form. These letters form complicated ligatures in the written language, with each of the different letter forms in general having a different shape. If a ligature table is built to accommodate them all, the table becomes very large, requiring many thousands of entries to store all the combinations possible of the 28-letter alphabet.

Other languages, such as Korean and Vietnamese, present similarly numerous and complex combinations of letters. Creating special tables specifically for languages with similar challenges hinders the standardization and size minimization of these tables, occupies too much memory, and requires a great deal of processor time for searching them. Thus, in a system that must process more than just a single written alphabet or character set—namely, virtually any system used for international purposes—it is not practical to use kerning and ligature tables with all possible combinations of letters in Arabic, Korean, Thai, Vietnamese, English, and so on. A workable international rendering system should be able to handle the variations in the display of characters in all of these systems without requiring a table entry for each combination of letters.

A different problem is presented when a user enters a character that is not specifically found in one of the tables. For instance, for some reason a user may wish to enter a ÿ (i.e. a "y" with an umlaut or diaeresis)—which may not be defined for a given system—or create some other character, such as a non-Latin alphabet character with a Latin-style accent. An example of the latter would be ก̂ (the Thai character "ko kai" with a circumflex on it), which is a combination that does not exist in any predefined alphabet. Such ad hoc characters cannot be handled by conventional systems, which, when encountering undefined characters, typically simply substitute a space or a default symbol for the unknown code points.

A system is needed that provides for user-created glyphs that are not already defined in the system's tables by analyzing the code points and rendering glyphs as nearly as possible. This should be done without creating large tables of special characters. In particular, a system is needed that can accommodate such large numbers of character combinations as found in Thai, Arabic, Korean, etc., while minimizing the sizes of the character tables such as ligature and kerning tables.

Figure 1:
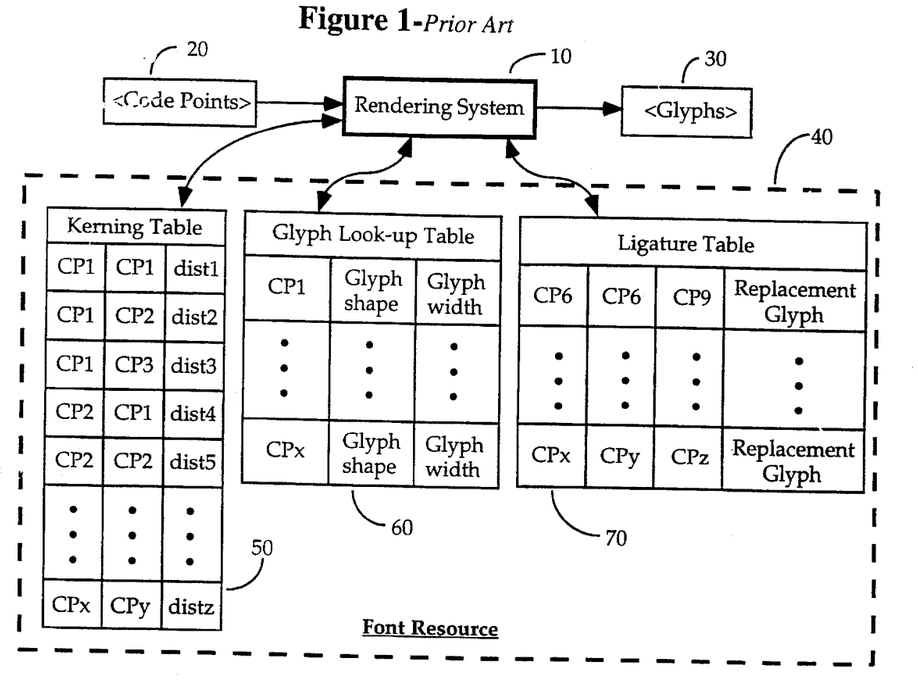
FIG. 1 is a block diagram showing a conventional system for rendering glyphs.

FIG. 1 shows a portion of a system for implementing conventional approaches to rendering characters. The rendering system 10 is an application resident in the memory of a central processing unit, and accesses a font resource 40 comprising kerning table 50, glyph look-up table 60 and ligature table 70. These tables are also stored in the memory. Characters encoded as code points 20 are input to the rendering system 10, which generates output glyphs 30 that depend upon how the code points map onto one or more of the tables 50, 60 and 70.

The code points 20, which are binary-coded representation of the characters, are input by a user or received from a file or other source of text. For Unicode, each code point constitutes a 16-bit (2-byte) word. The examples below will be in terms of Unicode, although any character encoding scheme may be used with the present invention.

Each of the three common procedures (corresponding to the tables 50–70) for handling incoming character streams has particular utility for certain languages. The rendering system matches the input code points to entries in the tables. For instance, the word " finds" may be input, which would be represented in Unicode by the following code points:

```
   f        J        i        n        d        s
U+0066   U+200D   U+0069   U+006E   U+0064   U+0073
```

The code point for "f" is "U+0066", the "U+" indicating that this is a Unicode code point, "0066" being the hexadecimal representation of the letter. Next comes a "J", followed by the second letter, "i". The "J" here represents a special Unicode-represented character meaning "join", indicating that the two letters should be joined together in a ligature: fi (no ligature) becomes fi (with ligature) for this example. The joining character "J", which is optional, might be generated automatically by the application in which the text element "finds" was originally produced, or it might be entered deliberately by the user. Following the "J" are the code points for the remainder of the word.

The rendering system 10 could be configured to handle this word using any of the tables 50, 60 and/or 70. For instance, it can first check the ligature table 70, then the look-up table 60, and finally the kerning table 50. A ligature such as " fi" is likely to be stored only in a ligature table, but in other alphabets it is likely that combinations of letters would be stored in any of the ligature, look-up and kerning tables. This is the case, for instance, for Thai, where letter combinations including vowels or tone marks are numerous.

The ligature table 70 represents a possible set of code points (CP6, CP9, . . . , CPx, CPy, CPz) that have been selected because they represent examples of ligatures for the particular alphabet in question. For instance, CP6 might represent an "f", and CP9 an "i", so that CP6-CP6-CP9 is the code point representation for "ffi". The rendering system locates this sequence in the table 70, and thus, instead of outputting the sequence "ffi", substitutes a replacement glyph " ffi". Other specific cases are stored in the ligature table.

In the above example, " finds" might be analyzed by first looking at the look-up table, and locating the letter "f". Then the system consults the ligature table 70 to see if there are any ligature beginning with "f", and locates an entry "CP6-CP9" (corresponding to the sequence 0066-0069), representing "fi". The joining character "J" indicates that a ligature is desired, so the glyph " fi" is output.

The next code points, representing the string "nds", are located in the look-up table 60, which for each code point includes a glyph shape and a glyph width. Ultimately, all of the input code points 20 have been output as glyphs 30.

Alternatively or in addition, the code points may be found in the kerning table 50, which is designed to handle spacing between predefined sequences of characters. For example, the spacing between the "f" and the "i" would be determined by locating the sequence "CP6-CP9" in the kerning table (ignoring the joining character). The tables may be used in combination, with the look-up table returning the glyph shapes and widths, and the kerning table returning the inter-character spacing.

From the above, it will be seen that the glyphs that the rendering system can return are limited by the sizes of the tables. Moreover, for glyphs formed by combining or joining two or more characters, the width/spacing approach does not optimize the glyph shapes; for instance a capital Ü (U with umlaut) might appear simply as a capital U with an overstruck umlaut: Ü. While a ligature table provides shape optimization, as mentioned above none of these tables can accommodate the many thousands of existing possible letter combinations, much less the multitude of possible combinations that are not regularly used, but that a user might want to print for some special purpose (such as the ñ combination mentioned above). A system is needed for handling these special cases without unduly increasing the sizes of the tables.

SUMMARY OF THE INVENTION

The present invention comprises apparatus and a method for rendering glyphs based upon a stream of input code points, which may be obtained from input devices, stored files, or the like. The code points are classified into one or more of several predefined classes, and subsets of the stream of code points are grouped into text elements that take the form of predefined regular expressions. The classification and grouping are executed by a parser constructed by Lex, YACC or the like, modified to accept Unicode or other internationally compatible character codes.

From a set of code points many such text elements are constructed, each generally including a spacing (base) character and possibly one or more combining characters such as tone marks, accents or other diacritics that will share a display or print cell with the base character. There may also or instead be one or more joining characters, forming ligatures or kerned together with the base character.

DESCRIPTION OF THE PREFERRED EMBODIMENTS

Figure 2:
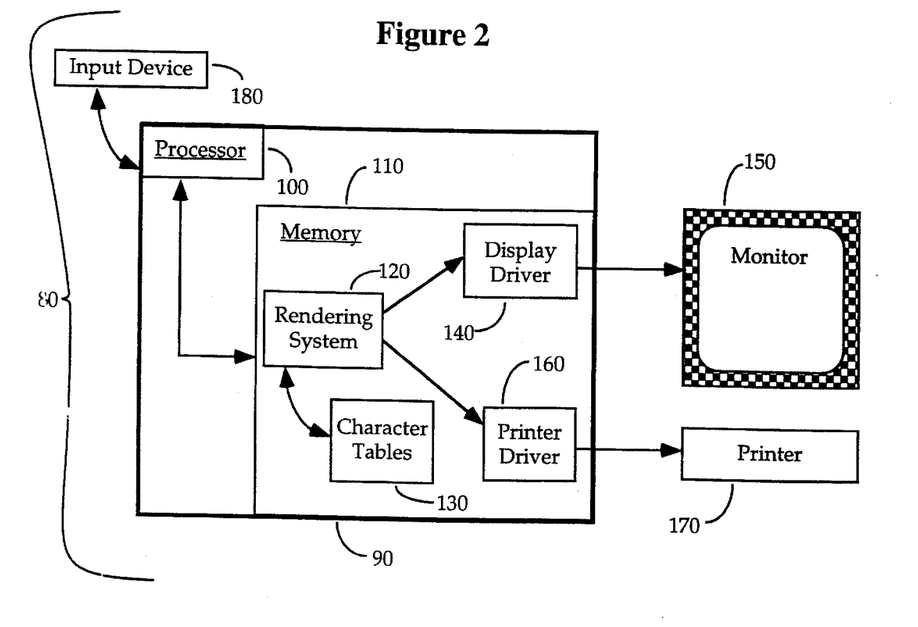
FIG. 2 is a block diagram of an apparatus for displaying and printing glyphs.
Figure 3:
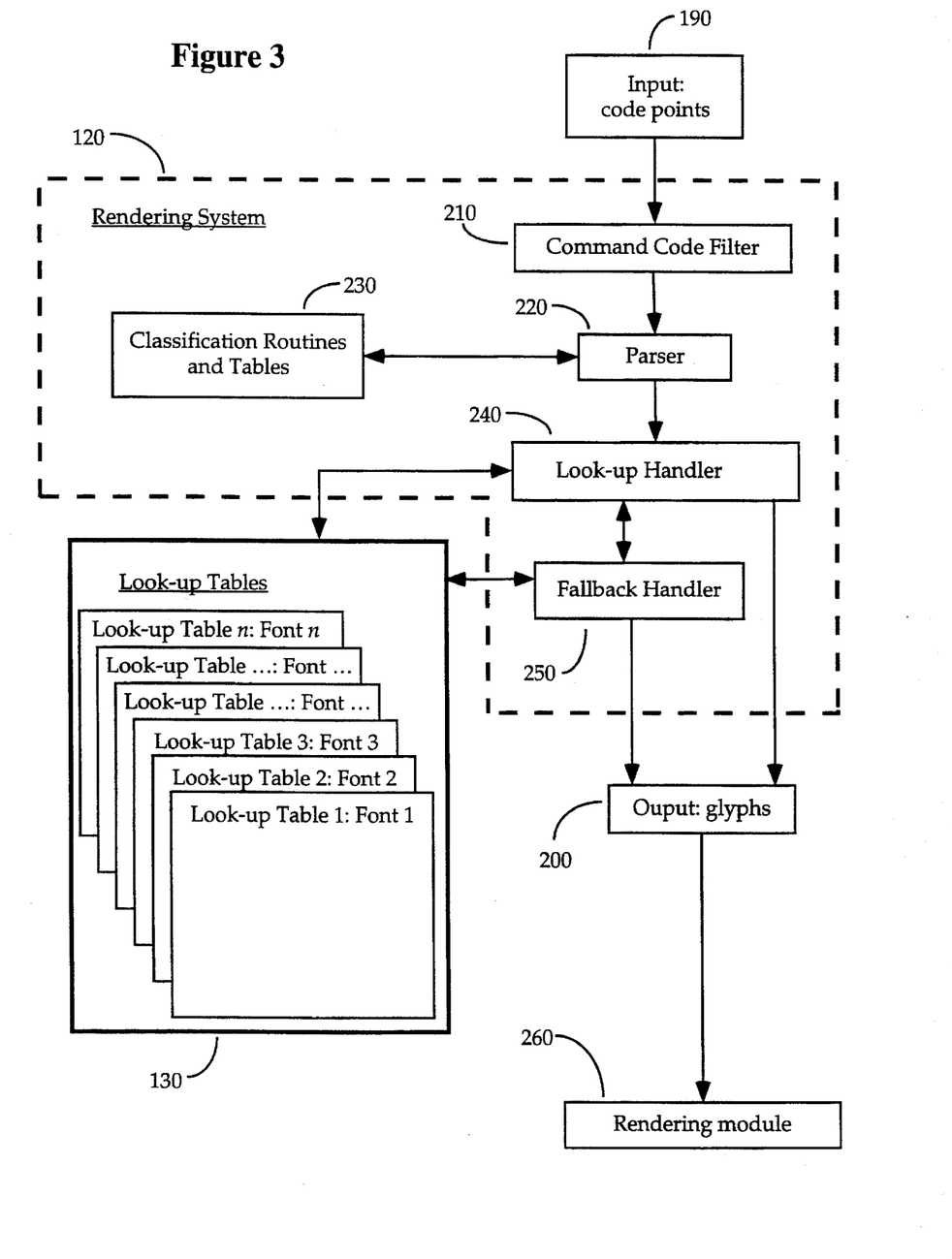
FIG. 3 is block diagram of a system for rendering glyphs according to the invention.

The system of the invention can be implemented in software with modules as shown in FIG. 2, and used on the apparatus shown in FIG. 3. Rendering system application 120 in FIG. 3 has code points 190 as inputs, and produces as outputs glyphs 200, which are then rendered for display by rendering module 260.

FIG. 2 shows a computer system 80 with display and print capabilities, including a computer 90 with a conventional processor 100 and memory 110. The memory stores rendering system 120, character tables 130, a display driver 140 for controlling a monitor 150, and a printer driver 160 which controls a printer 170. Characters are input in streams of codes from an input device 180, which may be a keyboard, a disk storage with text files, a modem, or any other source of coded text. Glyphs representing the input characters are rendered for display on the monitor 150 or printing on the printer 170, or for output on some other device.

Figure 4:
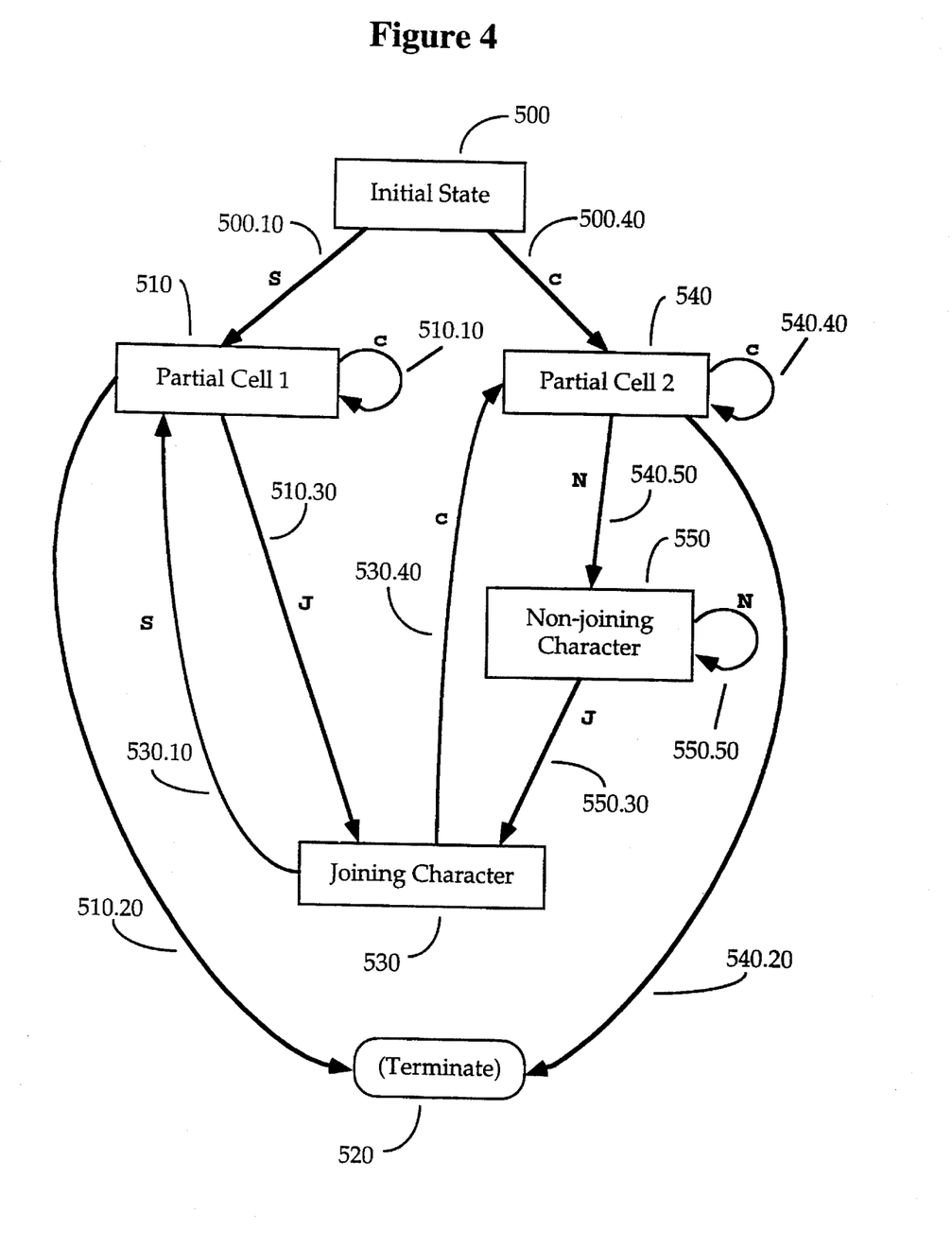
FIG. 4 is a state diagram representing the formation of regular expressions for the system of the invention.
Figure 5:
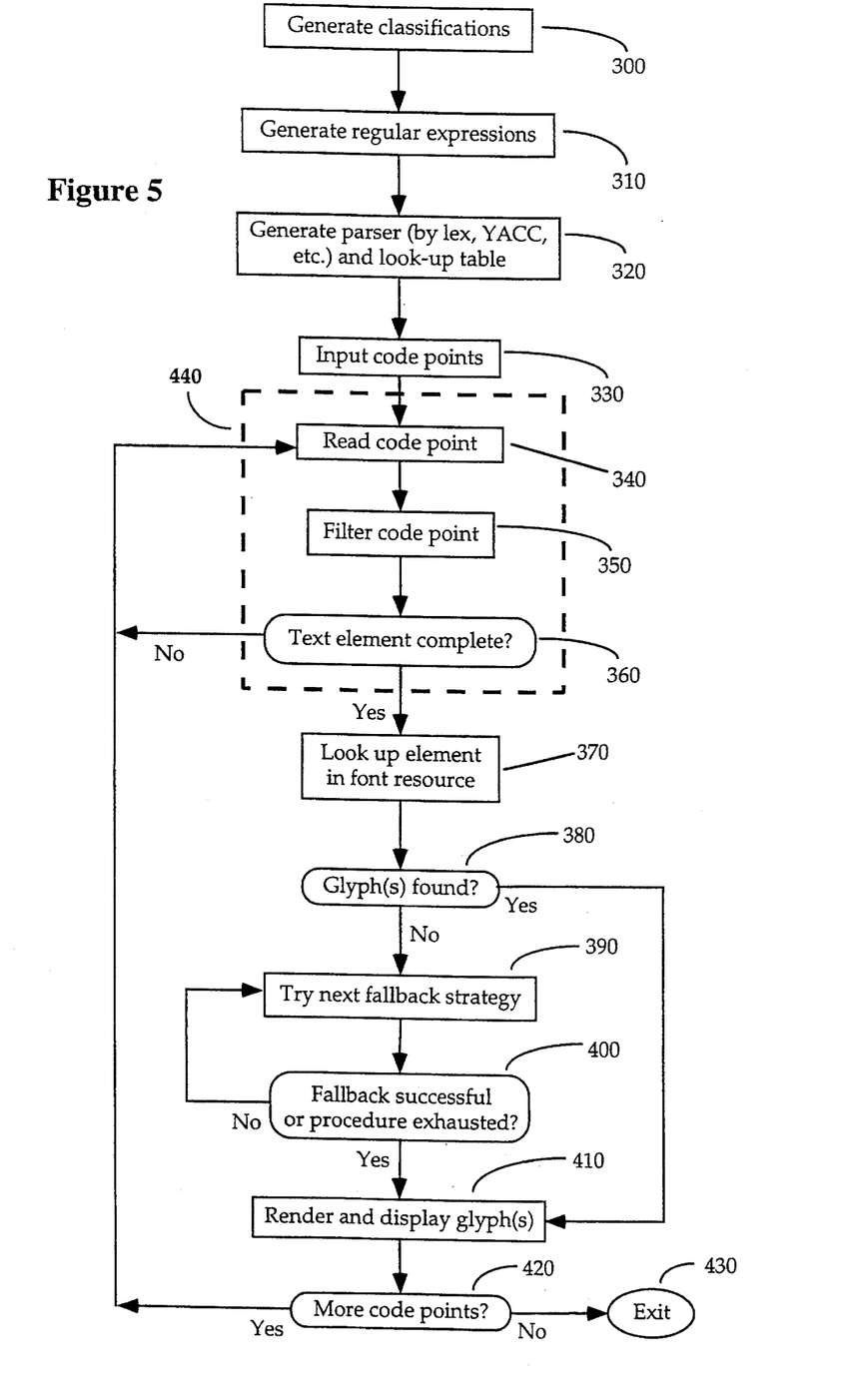
FIG. 5 is a flow chart representing the method of the invention.
Figure 6:
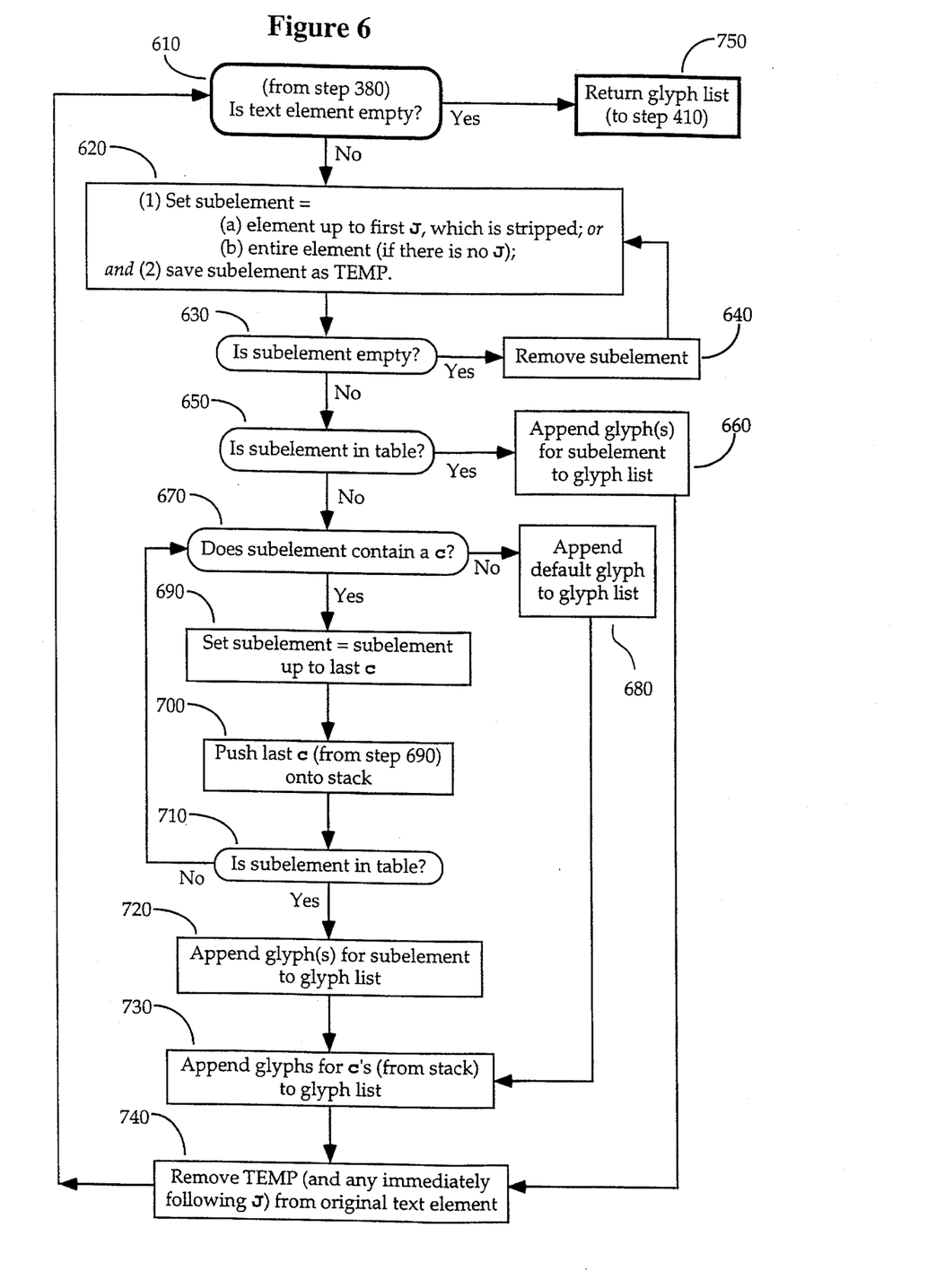
FIG. 6 is a flow chart depicting the fallback rendering procedure of the invention.

FIG. 3 is a detailed diagram of the software modules making up the rendering system 120. FIG. 5 is an overall flow chart of the method of the invention, and FIG. 6 is a flow chart of the fallback handler of the invention. FIG. 4 is a state diagram representing formation of regular expressions by the invention.

Following is a general discussion of the invention, followed by a detailed description of the system of FIGS. 2–6, followed then by a broader treatment of the method of the invention for processing glyphs in the fallback handler when the glyphs are not found in the font resource.

The system of the invention is compatible with the conventional system of FIG. 1, but as will be seen below allows great reduction in size of the tables, in particular the ligature and kerning tables.

General Description of the Method of the Invention

Before the code points can be rendered, they must be classified, and the classifications are used to define regular expressions for the system, as discussed in detail below. These classifications and regular expressions are used as input to a modified form of a compiler such as Lex or YACC, thereby generating a parser 220 shown in FIG. 3. See Stephen Johnson, "YACC: Yet Another Compiler Compiler", Bell Labs (Murray Hill, N.J.). (YACC is also discussed in most UNIX documentation.)

Lex is described in "Lex-A Lexical Analyzer Generator" by M. E. Lesk and E. Schmidt of Bell Laboratories in Murray Hill, N.J. See also SCO UNIX® System V/386 Development System Programmer's Guide (especially Chapter 2: An Overview of Lex Programming), by The Santa Cruz Operation, Inc. (SCO PH: 014-036-900).

Whether Lex is used or YACC, it is used in the conventional manner to generate a parser with the testing capability to determine the classifications of the input code points, but modified to read Unicode characters and classes. It is a straightforward matter to modify Lex to do this (primarily involving increasing the length of the code points that may be read); otherwise Lex is used as is, in the conventional manner.

Code points 190 (see FIG. 3) received from the input device 180 (see FIG. 2) are input to the parser 220 at step 330 shown in FIG. 5. A first code point is read (step 340), and is filtered (step 350) by a command code filter 210 (see FIG. 3), which extracts code points representing system or application commands, since these do not correspond to glyphs to be displayed. The command code filter 210 may be of conventional design.

If the code point is one to be displayed or printed, thereby not representing a system or application command, then the code point is not filtered out at step 350 by command code filter 210. The method then proceeds to step 360, which determines whether an entire text element, as defined by the previously generated regular expressions, has been received. This determination is carried out by the parser 220 in conjunction with classification routines and tables 230. If not, the method returns to step 340, and another code point is read, which is filtered at step 350, and so back to step 360.

The routines and tables 230 are used by the parser 220 to determine the classification of input code points. Every code point has a classification, and even if a given system does not have the necessary font resource (including look-up table) to render a particular alphabet, writing system, etc., it should store the entire classification scheme of standardized code points. Thus, when an unknown character is encountered, even if the system cannot render the character, it can nonetheless treat the character in different ways depending upon its classification, such as whether it is a joining character or a combining character. The examples in the following discussion bring out this treatment.

Once a complete text element (such as a single letter, or a letter formed of joined characters, like ü) is constructed, then at step 370 the look-up handler 240 looks up the text element in the font resource (i.e. the set of tables 130). If a corresponding glyph is located (step 380), then it is displayed or printed at step 410. Otherwise, a fallback procedure is invoked by means of fallback handler 250, to try to find a suitable glyph to render that corresponds to the input text element, as at step 390.

The character or look-up tables 130 are used in the conventional fashion of looking up a glyph for a given code point in a specified font. A particular code point will lead to the location of different glyphs, depending upon which font has been specified by the user. There are n fonts represented in the n look-up tables of the font resource 130.

If the fallback procedure is at first unsuccessful at step 400, the method returns to step 390 to try another strategy. This might amount to a new iteration of a given fallback handler module, such as a new iteration of the loop at steps 670–710 shown in FIG. 6 (discussed below); or it might amount to trying a different approach in attempting to generate a glyph for the input text element, such as by switching from a fallback handler software module implementing Routine 4 below to one implementing Routine 5. The various strategies are discussed in detail below.

Once a fallback procedure is successful or is exhausted, the selected glyph or glyphs 200 are output for rendering and display at step 410. The rendering is carried out by the rendering module 260 shown in FIG. 3. Both rendering and displaying are achieved by conventional procedures, the details of which depend upon the particular hardware (processor, bus, monitor, printer, etc.) being used.

If more code points are present in the input (step 420), the method returns to step 340 to process the remaining glyphs. Otherwise, the method is complete, and exits at step 430.

Variations on the above order of steps may be made; for instance, the code points may be input, read and filtered all at once, and then submitted to the look-up handler, or they may be read in and input to the look-up handler as they are received, to speed up processing time. On the output side, the glyphs may be displayed as they are generated, as in the method of FIG. 5, or they may be identified and the glyphs (bitmapped or Postscript output, for instance) or their identifying codes may be stored in RAM, VRAM or other volatile or nonvolatile memory, as appropriate.

The look-up handler and fallback handler are shown in FIG. 3 as separate software modules, to make clear the distinction between a conventional look-up handler and the new fallback handler. Look-up handler 240 may be conventional for the most part, with the proviso that it should refer unsuccessful glyph searches to the fallback handler 250 for further processing. In practice, the look-up handler 240 and fallback handler 250 may constitute either separate glyph retrieval modules or may be implemented as a single glyph retrieval module; the distinction is unimportant, as long as the functions described below are provided.

Step 300: Generate classification of code points

Code points input to the system of the invention are preferably standardized to match an international standard, which in the present embodiment is the Unicode standard. The classifications of the code points in this embodiment are thus the same as those found in the Unicode standard. For the examples discussed below, these classifications are as follows:

Table 1: Classification of Code Points

1. Spacing. This is the most typical classification, and denotes a letter or other character represented by a glyph that occupies a single display or printing cell. A spacing character includes the glyph shape plus an indicator that the renderer should "space" to the next cell. Most Latin and Han-based (e.g., Chinese or Japanese) characters are spacing characters.

2. Combining. This code point has an associated glyph, but it does not usually occur in isolation within a display text element; it indicates a glyph that normally combines with a "spacing" glyph. Combining characters are the second most common, and are usually modifiers of the previous spacing character. In Latin-based writing systems, combining characters include diacritics (accents, tilde, umlaut/diaeresis, cedilla, etc.). They are more common in other writing systems such as Thai, where they can represent vowels and tone marks.

3. Control. Control code points are used for commands for the application or operating system, and are generally not rendered for display. There is no associated glyph and the code point does not affect the glyph mappings of adjacent code points. Control characters are filtered out and interpreted by a front-end module.

4. Joining. This is a special character class which causes the two adjacent text elements to be treated as one text element. Joining characters are rarer than the other classes, especially in Latin alphabets, but are important. In Latin-based writing systems, a joining character could force a ligature between two characters (such as f and i) or cause "¾" to be displayed in fraction format $$\left(\frac{3}{4}\right)$$

instead of in date format (3/4).

5. Non-joining. This is a special character class which causes the two adjacent characters to be treated as separate text elements, when they would normally be treated as combined or joined text elements. Non-joining characters are the rarest but are important in some writing systems. For example, in Arabic the letters "lam" and "alif" when adjacent are usually written as one glyph, and the joining is generally done automatically by the rendering system. If the intent is to separate them, such as when printing the Arabic alphabet, then a non-joining character between them would force the individual (non-combined) glyph forms.

A character can belong to more than one class. The classification of each character can be represented by a bit field of four flags, as follows:

```
typedef struct {
    Boolean control flag: 1;
    Boolean spacing/combining flag: 1;
    Boolean joining flag: 1;
    Boolean nonjoining flag: 1;
} CharClasses;
```

Each of these flags has a value of 1 for TRUE and 0 for FALSE. The combining and spacing properties are mutually exclusive, so we can represent both properties with a single "spacing" flag (1=spacing, 0=combining). Thus, a character having a classification of 0100 (FALSE-TRUE-FALSE-FALSE) would be a normal spacing character.

The joining and non-joining properties are not mutually exclusive, and must be represented by separate flags. For example, the Arabic letter "alif" is neither joining nor non-joining, per se. It will join with the letter "lam", but not with other characters, for example the digit 9. Since it does not force either behavior, we do not classify it as either joining or nonjoining (so for "alif", joining=FALSE and nonjoining=FALSE).

Given the CharClasses code point classification, the class for each code point can be assigned by setting the appropriate flags in an array of CharClasses, as follows (the "//" indicating comments):

```
static CharClasses UnicodeClasses[] = {
    { TRUE, FALSE, FALSE, FALSE },      // U+0000 NUL
    { TRUE, FALSE, FALSE, FALSE },      // U+0001 SOH
        ...
    { TRUE, FALSE, FALSE, FALSE },      // U+0020 US
    { FALSE, TRUE, FALSE, FALSE },      // U+0021 SPACE
    { FALSE, TRUE, FALSE, FALSE },      // U+0222 !
    { FALSE, TRUE, FALSE, FALSE },      // U+0023 "
        ...
    { FALSE, TRUE, FALSE, FALSE },      // U+00FF ÿ
        ...
    { FALSE, TRUE, FALSE, FALSE },      // U+0E01 Thai
                                        //   consonant
                                        //   "ko kai": ก
    { FALSE, TRUE, FALSE, FALSE },      // U+0E02 Thai
                                        //   consonant
                                        //   "kho khai": ข
        ...
    { FALSE, TRUE, FALSE, FALSE },      // U+0E30 Thai
                                        //   spacing vowel
                                        //   "sara a": ะ
    { FALSE, FALSE, FALSE, FALSE },     // U+0E31 Thai
                                        //   non-spacing
                                        //   vowel
                                        //   "mai han-akat": ั
        ...
    { FALSE, FALSE, FALSE, TRUE },      // U+200C
                                        //   Punctuation:
                                        //   zero-width
                                        //   non-joiner
    { FALSE, FALSE, TRUE, FALSE },      // U+200D
                                        //   Punctuation:
                                        //   zero-width joiner
```

-continued

```
      ...
{ FALSE, TRUE, FALSE, FALSE },      // U+FFE5
                                       Han-based
                                       character
                                       (in this case,
                                       Japanese), a
                                       full-width
                                       "yen": ¥
{ FALSE, TRUE, FALSE, FALSE },      // U+FFE6
                                       Han character, a
                                       full-width
                                       "won": ₩
      ...
};
```

The above code shows the structure for the entire table of Unicode classifications. The ••• ("bullets") indicate where blocks of code have been omitted; the entire code listing is tens of thousands of lines long, classifying most known writing systems, with most of the classifications being devoted to the myriad Hangul (Han-based) characters, such as Chinese and Japanese.

The sets of flags above are used as masks against the CharClasses bit field. Thus, it can be seen that the Thai consonant "ko kai" (ก) is classified as a spacing character (since only the second flag is TRUE), whereas the Thai nonspacing vowel "mai han-akat" ( ั ) is a combining character (since all flags are false, notably the "spacing" flag).

To extend the above list of classes to other languages, additional classes are defined. For example, the Korean writing system includes groups of characters called "jamos", which are combined in cells representing syllables. The rules for combining these characters depend on whether the jamo begins, continues or ends the syllable. Three such additional classes (initial, medial and final) would thus be needed for Korean, and a valid regular expression (see discussion of Step 310) might be represented, for instance, as IM*F. Korean and other writing systems are not explored in detail here, since the principles are the same as those in the examples in the present application. A relatively small set of classes can handle most of the writing systems of the world.

Step 310: Generate regular expressions

The present invention uses a grammar based upon the above classifications, wherein "regular expressions" are defined to specify the text elements. In this Lex-like grammar, we have the following atomic types:

```
C  matches any code point for which control is TRUE.
S  matches any code point for which spacing is TRUE.
c  matches any code point for which spacing is FALSE.
J  matches any code point for which joining is TRUE.
N  matches any code point for which non-joining is TRUE.
```

We can use regular expression operators, including:

```
+      one or more
*      zero or more
|      or
``` to combine these atomic classes into regular expression tokens:

```
{control}   C+
{cell}      Sc*|c+N*
{element}   {cell} (J{cell})*
```

Thus, a control character is represented by "C+", which indicates both that it is a control character and that one or more control characters may legally occur in a string.

A "cell" is an occurrence of one instance of "Sc*" or one or more instances of "c+N*". "Sc*" indicates a single spacing character followed by zero or more combining characters; thus, "Sccc" indicates a string of one spacing character followed by three combining characters, and is a regular expression of the form "Sc*". The strings "cc" and "cN" are both regular expressions of the form "c+N*", which always has one or more "c" characters followed by zero or more "N" (nonjoining) characters.

The array "element" refers to a completed text element, and has been defined as a series comprising a cell followed by zero or more instances of a joining character plus another cell Thus, indefinitely many cells may be concatenated into a text element, using joining characters.

The system of the invention uses these regular expressions to specify action routines that are executed by the parser whenever it recognizes a valid token. In the preferred embodiment, a Lex-like syntax is used.

Step 320: Generate the parser

The classes, regular expressions and action routines are then used as input to a parser generator, which may be virtually identical to Lex, but modified to read Unicode characters, as discussed above. It is a straightforward matter to modify Lex to do this; otherwise it may be used as is, in the conventional manner.

The modified Lex is thus used to generate a parser. The parser is essentially an optimized state machine that can read the input stream of characters, compare them against the regular expressions, and output complete text elements. A graphical representation of such a state diagram for the regular expressions defined above is shown in FIG. 4, which can be read in much the same manner as the text form of the regular expression definitions. FIG. 4 is a conventional state diagram: states are represented by boxes (and are referenced by integer reference numerals: 500, 510, etc.), while transitions are shown as arrows between states, and are referenced by decimal reference numerals reflecting the from-state before the decimal and the to-state after the decimal. For instance, transition 500.10 goes from the initial state 500 to the "partial cell 1" state 510.

Each transition is marked with a letter indicating the character to be added if that transition is taken. For example, transition 500.10 represents the adding of a spacing character to a cell (as indicated by the "S"), and transition 510.10 represents adding a combining character ("c"). Other transitions are labeled with "J" for joining or "N" for non-joining, as well as other instances of "S" and "c". Transitions 510.20 and 540.20 do not add characters, but merely terminate a given text element.

Thus, starting at the initial state 500 and proceeding along transitions 500.10-510.10-510.10 (again)-510.30-530.10-510.20 would build a cell "SccJS", which is a valid text element as defined above. A text element comprising "ccNJs" is also valid, and is represented by taking transitions 500.40-540.40-540.50-550.30-530.10-510.20. It can be seen by inspection that the state diagram of FIG. 4 is equivalent to the above-defined list of regular expressions. The exit transitions 510.20 and 540.20 are not explicitly entered in a character string, but are taken whenever the next element that the parser encounters in a string is not a valid following character, such as an "S" character immediately followed by another "S" character (which is the most common occurrence in English); in this case, the parser automatically inserts a terminating code between the two characters.

Steps 330-360 Input, read and filter code points; generate text elements The rendering system 120 shown in FIGS. 2 and 3 reads in a stream of code points for rendering. The input code points are first read and filtered (steps 340 and 350 shown in FIG. 5) to extract control characters. Then begins the loop at steps 340–420 of FIG. 5, where each of the text elements is examined to see if it is represented in the font resource (step 380). If so, the text element is displayed or printed (step 410) and the next text element, if there is one, is examined (steps 420 and 340–370). If the text element is not found in the font resource, the fallback procedure (steps 390–400) is executed. The loop of steps 340–420 continues until all the input code points have been rendered or otherwise dealt with, and the method exits at step 430.

The code points are read and filtered at steps 340–350 until a complete text element is identified at step 360, i.e. a valid regular expression as defined above and by FIG. 5. Steps 340–360 are executed by the parser 220 with reference to the classification routines and tables 230. The parser can thus pre-process an entire file of text elements before the results are submitted to the look-up handler 240.

The following action routine serves as the core of a filter routine, specifying that the parser should perform no operation (signified by the semicolon with no other instruction) whenever it encounters a sequence of control characters:

---
{control} ;         // Ignore control characters
---

This can be read: "if a control character is located, take no (rendering) action". In general, in a statement of this sort the parser will execute the pseudocode expression on the right side of the line if it locates and recognizes the regular expression appearing in curly braces on the left side.

Steps 340–360 together constitute a procedure 440 (see FIG. 5) by which the parser builds text elements. The formation of the text elements is enabled by the regular expressions discussed above. It is these complete text elements, rather than individual code points, that are submitted to the look-up handler 240 and the fallback handler 250, providing analysis of the input code points on a level different from previous rendering systems.

Steps 370 et seq.

The heart of the parser is an action routine which obtains and displays one or more glyphs whenever it recognizes a complete text element. This is represented in the following pseudocode:

---
Routine 1: Locate and Display Text Element (steps 370–410)

```
{element} {
    UniChar element[8];      // Declare element buffer
    GlyphID glyphs[8];       // Declare glyph id buffer
    find_glyph( element, glyphs );   // Routine 2, below.
    display( glyphs );
        // Display located or default glyph(s)
};
```
---

The software implementing Routine 1 is part of the rendering system application depicted in FIGS. 2 and 3, and runs as control code for the application modules 210–260 in FIG. 3. According to Routine 1, whenever a text element is encountered the two buffered arrays "element" and "glylph" are declared, and the routines "find_glyph" (see below) and "display" are executed. The "display" routine may be any conventional routine for rendering and displaying glyphs such as text or other characters on a screen, or for printing or otherwise outputting them for viewing.

Steps 370–380 Look up text elements

Once a valid text element is found, it is passed to the look-up handler 240 (see FIG. 3), which then carries out the look-up procedure of step 370 shown in FIG. 5. The location of the element in the font resource is itself a conventional database look-up. The search key for the look-up is the input text element, composed of one or more encoded characters recognized as a token by the parser. If the text element exists in the database, then the look-up function returns the glyph identifier. If not, then the look-up function invokes the fallback handler, discussed below.

Pseudocode suitable for implementing the glyph look-up is as follows:

---
Routine 2: Find Glyph (steps 370–400)

```
void find_glyph(
    const UniChar *element,   // Text (display) element
    GlyphID *glyphs );        // Resulting glyph id(s)
{
//   If the element is found in the database, then
//       use it. Otherwise, invoke the fallback handler:
    if ( search( element, glyphs ) == NULL )  // (Routine 3)
        find_fallback( element, glyphs );   // (Routine 4 or 5)
}
```
---

The software implementing this pseudocode resides in the look-up handler 240 shown in FIG. 3.

Routine 2 declares "find_glyph" with a display element (i.e. "element" as defined in Routine 1) as input. This is defined as a constant (since it is not changed by the routine) of the type "UniChar", which is a type definition for Unicode denoting an array of Unicode characters. The name "*element" denotes a pointer to the first element of the array "UniChar", which would typically be stored in a buffer memory for the parser. An eight-Unicode-character (16-byte) block of the buffer memory was reserved in Routine 1 for the text element array by the statement "UniChar element [8]".

Routine 2 results in the rendering and displaying of a single glyph for each text element that is found at first try in the look-up table. If the find_fallback procedure is invoked, several glyphs may be output.

The output is a glyph-identifying code stored in the array "GlyphID", also in buffer memory; the block of buffer memory for this array was reserved in Routine 1 by the statement "GlyphID glyphs [8]", and is also eight Unicode characters (16 bytes) in size. The pointer "*glyphs" points to the first address in the array "GlytDhID".

The "search" procedure is a conventional search function to locate the input text element in the resource font resource 130, such as:

---
Routine 3: Search for Text Element (step 370)

```
void search( element, glyphs);
{
    if element is located in resource, return glyphs;
    else return NULL;
}
```
---

This determines whether the text element is present in the font resource, and if so returns the code representing the glyph corresponding to the input text element, and places it in the buffer memory at the glyphs location reserved in Routine 1. The particular look-up table searched depends upon the font specified by the user for the input characters.

If the look-up handler 240 locates this text element in the look-up tables 130, it passes the code representing the glyph for the text element as input to the rendering module 260 for rendering and display or printing, as indicated at step 410 of FIG. 5. The system then determines at step 420 whether there are more code points; if there are (indicated, e.g., by the lack of an end-of-file indicator), then the method returns to step 340 for the next text element.

If the text element is not found, then Routine 3 returns a NULL, which results in calling the fallback procedure, "find_fallback".

Steps 390–400: Fallback procedure

The fallback handler 250 receives a complete text element as input, and can process it in a number of different ways. In general, the choice of strategy will depend on the application; several strategies are described below. A commercial application would typically include some subset of these strategies into a single fallback handler to obtain the best substitute glyphs for that application.

Common to all the fallback procedures is that they begin with a complete text element generated by the parser at steps 340–360, and attempt to preserve its integrity to the extent possible while analyzing subelements, i.e. subsets of the text element, to determine whether any subelement can be displayed by the system. The general fallback method is shown in FIG. 6, which is discussed below.

One simple fallback procedure could substitute a box ▯ or another default character (or a blank) for any display element not found in the database. This approach is of necessity used by current systems that have no structure for handling situations where an unknown text element is encountered.

The present invention, however, uses a fallback handler that analyzes the input text element and generates outputs that depend upon the contents of the text element, i.e. the individual code points and their order.

Each of the fallback procedures discussed below has certain advantages and utility in particular settings. Important common features of the fallback procedures represented in following routines are combined in the generalized fallback procedure depicted in the flow chart of FIG. 6, which is discussed following the discussion of Routines 4 and 5.

The Fallback Method of Routine 4

Following is pseudocode for a Routine 4, for implementing a fallback procedure of the invention:

---

Routine 4: Fallback Procedure (steps 390–400)

```
void find_fallback
    const UniChar *element   // text element
    GlyphID *glyphs );       // resulting glyph id(s)
Unichar subelement[8] = element;
{
    do {
        element[ Length( element ) – 1] = 0x0000;
            // This strips the last character from the
            text element.
        if ( search( element, glyphs ) != NULL )
            return;
            // If the element is in the look-up table, the
            fallback procedure is complete for the moment.
            Otherwise, keep stripping until a subset of
            "element" is located as a valid glyph, or
            until nothing is left.
    }while ( Length( element ) >1 );
    // If the procedure reaches this point, not even
    the base character is recognized. A default
    character (such as a box ▯) must be used.
    glyphs[0] = FALLBACK_GLYPHID;    // Just make it a box
    glyphs[1] = 0x0000;              // Terminate string
}
```

---

The expression "Length (element)–1" represents the last position in the array making up the text element. The first position is (in standard fashion) regarded as position 0, the second as 1, and so on; so the length of "element" minus 1 is the last position. Setting this element to "0x0000" terminates the array "element" at that point, thus automatically shortening the array and stripping terminal code points off, as described below; when this line is encountered again, the next code point at the end of the (shortened) array will be stripped, and so on.

The fallback procedure of Routine 4 strips off combining marks, thereby reducing the input text element, until the remaining text subelement is a text element that is found in the look-up table. For example, the character ṳ, which would be represented as a three-character text element composed of u, followed by an umlaut (which is a combining character), followed by an underscore (also a combining character), is not a glyph in most fonts. This text element is a regular expression of the form "Scc", corresponding to the three characters "u ¨ __".

If the look-up handler 240 does not locate this text element in the look-up tables 130, it passes the text element to the fallback handler 250, as indicated at steps 380 and 390. The fallback routine begins by stripping off the last character (code point) in the text element, in this case the underline. This leaves only the text subelement "u ¨ ", which the fallback handler 250 then locates in the tables 130. This is then passed as output (box 200) to the rendering module 260, which will render the "ü".

When the underscore character is stripped off from the text element "u ¨ __", if the subelement "ü" is not found in the tables, then the fallback handler strips off the umlaut. The "u" is then located.

If no umlaut is located as a sole text element in the look-up tables, a substitution may be made with a known character, such as a double-quotation mark", which would then be combined with the "u" to form the character "ü". This is not ideal, but at least is a reasonable substitute for the character "ü".

Substitutions like this can be built into the fallback handler software module, so that the system is portable to many different applications, which do not need to store information about any of the "unknown" characters such as umlauts; instead, the fallback procedure makes substitutions whenever necessary, when a text element is not found, a substitute character has been specified, and the substitute character exists in the look-up table.

The substitute character may be more than one character; for instance, if the Japanese "yen" symbol (¥) is encountered, and does not exist in the look-up table, it can be built up from a Y and two dashes combined into a single cell, looking like ¥, which again is not ideal, but is recognizable as the intended character. Another useful type of substitution would be transliterated characters from non-Latin alphabets, such as Chinese, Japanese, Cyrillic, and so on, so the user would at least get a phonetic representation of any text whose actual glyphs are not stored in the system.

If both the underscore and the umlaut are stripped off the text element "ṳ" and the last remaining code point (the "u") is still not found, and no substitute character is available, then the final fallback is still the default character, such as the ▯ glyph. Even this, though—or, preferably in the case of combined characters, a blank—can be combined with the umlaut and underscoring, so that the viewer at least gets some of the information originally included in the text element. Likewise, if the umlaut is completely unknown to the fallback handler, then it can be omitted, but the "u" and the underscore can be displayed anyway.

When the fallback procedure has been executed once, at least one code point has been stripped from its end. This stripped portion is preferably itself saved and processed as a new element to be displayed. As in the case of "ṳ", the subelements are often individually valid, even if the text element as whole is not found in the look-up table. Thus, it is desirable to save the stripped portion of "element", and after Routine 4 to set "element" equal to this stripped portion, and in Routine 1 to again call the "find_glyph" procedure.

In contrast to Routine 4 above, in Routine 4A both the "ü" and the underscore character would be preserved for rendering; and since the latter is classified as a combining character ("c"-type), it is combined into the same display cell as the "ü", and the output "ü̱" is the same as if the entire text element had been found in the look-up table to begin with.

To save the remainder of a text element, the following approach may be used: the last character is removed from the text element (as in Routine 4), and the glyphs for the remainder are located. If the last character has an associated glyph itself, it is concatenated with the other located glyphs:

```
Routine 4A void fallback_handler (
    const UniChar *element,    // Text element
    GlyphID *glyphs )          // Glyph id's
{
    // Declarations
    int index;                 // Index of last character
    UniChar last[2];           // Last character from element
    GlyphID lastid[8];         // Glyph(s) for last character
    // Remove the last character and save it.
    index = Length( element ) – 1;
    last[0] = element[ index ];
    last[1] = 0x0000;
    element[ index ] = 0x0000;
    // Get the glyph id's for the rest of the string.
    // Note: this may recurse if the element is not in
    the table.
    lookup_glyphs( element, glyphs );
    // If the last character is in the lookup table:
    if ( search( last, lasted ) != NULL )
        // Concatenate the glyph for the last character.
        concatenate( glyphs, lastid )
```

The foregoing pseudocode will recurse if, for instance, the original text element is for the glyph ǘ, i.e. u-umlaut with an accent mark, and the look-up table for the current font has neither the full glyph nor the ü without an accent. The first invocation of this routine removes the accent and attempts to find the ü. This attempt fails, and the routine is re-invoked. The second invocation of this routine removes the umlaut, and locates the glyph for "u" by itself. A glyph for the umlaut (perhaps as a fallback, a double-quote mark) is then concatenated with the "u" glyph. The actual overprinting of the two characters is hardware-specific; it may require backspacing (on a some printers or terminals), or special escape sequences, and so on.

The Fallback Method of Routine 5

An alternative fallback procedure replaces elements containing joining characters with separated elements. This may be used in place of or in addition to Routine 4. For example, an element consisting of "3J/J4", which would map to the three-fourths fraction format $$\left(\tfrac{3}{4}\right)$$

if it exists in the available font, could decompose into "¾" if it does not.

```
Routine 5: Alternative Fallback Routine void find_fallback(
    const UniChar *element,    // Display element
    GlyphID *glyphs )          // Resulting glyph(s)
{
    // Declarations:
    int i;                     // Index into element
    UniChar subelem[8];        // Subelement
    int len = 0;               // Length of "subelem"
    int glen = 0;              // Number of glyphs
    // Scan the element for a joining character.
    for ( i = 0; i < Length( element ); i++ )
    {
        // If it is a joining character, look up this part:
        if ( element[i] == JOINING ) {
            // Terminate the subelement.
            subelem[ len++ ] = 0x0000;
            // Look up the glyph(s) for the subelement.
            find_glyph( subelem, glyphs + glen );
            // Prepare for the next subelement.
            glen = glen + Length( glyphs );
            len = 0;
        }
        // Otherwise just add the character.
        else {
            subelem[ len++ ] = element[ i ];
        }
    }
    // Look up any remaining subelement.
    if ( len > 0 ) {
        // Terminate the subelement.
        subelem[ len++ ] = 0x0000;
        // Look up the glyph(s) for the subelement.
        find_glyph( subelem, glyphs + glen );
        // Prepare for the next subelement.
        glen = glen + Length( glyphs );
        len = 0;
    }
}
```

Routine 5 breaks the text element up into subelements at the "joining" characters; thus, "SccJS" would become "Scc" and "S", the "J" being dropped. This is particularly useful when a particular system does not have a desired ligature set, but has the basic characters. For instance, if a given user's system does not include the many thousands of potential ligatures that are possible in Arabic, but includes the basic Arabic alphabet, then Arabic text can still be rendered and displayed, with the letters separate from one another. While this is not the usual form of display for the language, it is preferable to the alternative, which is losing the information altogether. Also, it is actually desirable when the user wants to print individual letters, such as in listing the alphabet or expressing mathematical equations with Arabic (or other alphabets') letters.

The procedure of Routine 5 has the advantage that it can eliminate thousands of entries from ligature and kerning tables that it would otherwise be necessary to store. Although ligatures in some writing systems, such as Arabic, significantly modify the shapes of the letters, in other writing systems—such as Thai and Vietnamese—many thousands of possible combinations that can be formed basically by positioning the combining characters in certain predefined locations in the display cell. The vowel marks, tone marks and other combining characters in such systems are like the diacritics (accents, etc.) in English, in that they need not change the basic shape of the underlying character to be readable.

Generalized Fallback Strategy

FIG. 6 is a flow chart for a procedure for handling cases covered by both Routines 4 and 5, and in general for dealing with any text element with one or more unknown code points (i.e. not found in the font resource), in particular where the text element contains J's or c's.

The procedure of FIG. 6 is executed by the look-up handler 240 in conjunction with the fallback handler 250, and details a preferred manner of implementing steps 390–400 in FIG. 5, with stress on the method used by the fallback handler. At steps 620–660, unknown joining (J) characters are removed, and the characters that otherwise would have been joined are added to a glyph list for separate rendering. In steps 670–730, combining (c) characters are located and removed, and the remaining characters are added to the glyph list as specified in the text element. The entire text element is methodically searched for unknown characters, which are removed while preserving combining-character information, and the known portion of the text element is displayed. This will be clear in the following examples.

EXAMPLE 1

$S_1JUJS_2$

Consider an input text element of the form $S_1JUJS_2$, where S and J have their normal meanings (a spacing character and a joining character, respectively), $S_1$ and $S_2$ represent known spacing characters, and U represents an unknown spacing character. The J's indicate that the output glyph should join all three characters $S_1$, U and $S_2$ (if they were all known characters).

This can arise where the system that originally generated the text included a glyph with three spacing characters joined together (of the form $S_1JS_{unk}JS_2$), but the middle "S" ($S_{unk}$) is unknown in the system which is now trying to render the text element; that is, the "$S_{unk}$" has no entry in the look-up tables. The J's indicate that the output glyph would including a joining of all three characters $S_1$, $S_{unk}$ and $S_1$ (if they were all known characters).

Examples of joined characters are scarce in English, but common in other languages. It would be possible to form an effective "ffi" ligature by using the joining character "J" between the two f's and between the second f and the i (but this would not match the SJUJS pattern above, since the middle character is known if the first character is known).

A more likely situation is the use of joining characters to indicate the ligature formed by the three Arabic letters alif-lam-sin. Alif and lam are joined together in a ligature, then the alif-lam ligature is joined with sin to form a three-letter ligature.

If all three characters are known, the text element would have the form SJSJS, and if neither the three-character glyph nor the alif-lam glyph is in the look-up table then the present system prints out the three separate characters alif, lam, sin.

In this case, the middle character "lam" would presumably be available to the system if the alif and sin are available, but it is possible for a new character to appear which is not known. The present example analyzes the latter, slightly more complicated, case.

The method of the invention allows the system to extract and display the known pieces of information from the text element "$S_1JUJS_2$", rather than merely disposing of the entire text element, as would be done in existing systems. Thus, here it is desirable to display "$S_1S_2$" (the first and last S's), stripping out the "JUJ" from the middle.

At step 380 (FIG. 5), no glyph would be found for the text element "$S_1JUJS_2$", so the method proceeds to step 390, i.e. to step 610 of FIG. 6. Step 610 determines that the text element is not empty. At step 620, a subelement is first defined as the portion of the text element up to (but not including) the first occurrence of a J, and the first J is stripped. In the present example, this leaves a subelement $S_1$. In addition, the subelement is saved as TEMP.

The subelement is not empty (step 630), and we have assumed it is in the look-up table, so at step 660 $S_1$ is appended to the glyph list (and is at present the only member of the glyph list).

At step 740, the subelement and any immediately following joining character J, if there is one, are removed from the original text element. This amounts to removing "$S_1J$" from "$S_1JUJS_2$, leaving "$UJS_2$" as the text element. Returning to step 610, this is not empty, so at step 620 a new subelement is generated, consisting of "U"; the remaining J is stripped at step 620(1)(a). The subelement is saved as TEMP, at step 620(2).

The subelement is not empty (step 630), nor is it found in the table (step 650). It does not contain a c (step 670), so a default glyph (a box, a blank, etc.) is appended to the glyph list (step 680), which now has the value "$S_1 \square$". At step 730, glyphs for any c's in the stack (there are none as yet) are appended to the glyph list, and at step 740 the "U" code point (which has been saved as TEMP) is removed, along with the immediately following "J". This leaves only "$S_2$" in the original text element.

The modified text element is not empty (step 610). At step 620, there are no J's in the text element, so the entire text element $S_2$ is designated as the subelement (step 620(1)(b)) and saved as TEMP (step 620(2)). The subelement is not empty (step 630), and it is found in the table (step 650), so its glyph code is appended to the glyph list (step 660), which now has the value "$S_1 \square S_2$". At step 740, the value for TEMP ("$S_2$") is removed from the original text element, which has itself been reduced by this point to "$S_2$", thus leaving an empty string as the text element.

At step 610, since the text element is empty, the glyph list is returned (step 750). The method then returns to step 410 (FIG. 5), where the glyph list is displayed as normal.

From the foregoing, it is clear that from the original text element "$S_1JUJS_2$", only "$S_1 \square S_2$" has been preserved in the glyph list for rendering. This is sensible: since the "U" was unknown, it cannot be displayed, and for the same reason it cannot be determined how the $S_1$, U and $S_2$ would have been joined together, so the joining information is disposed of and only the known characters $S_1$ and $S_2$ are displayed, with a box ($\square$) between them to represent the unknown character ("U").

In the alif-lam-sin example above, if it is assumed that the character "lam" is unknown (i.e. not present in the tables 130), then the display of the glyph list would be alif-$\square$-sin, with the default character representing "lam".

EXAMPLE 2

$S_1c_1uc_2$

This example is of the form Sccc, where the second combining character c (represented as u) is unknown, but the other characters can individually be found in the tables. An example of the form Sccc might be ǘ_, i.e. a u-umlaut with an accent and underscore, where the code points appear in the order: u ¨ ´ _ (u, umlaut, accent, underscore). This unusual combination of characters is used to illustrate the types of situation that the present system can handle. It will be assumed that the accent mark ( ´ ) is unknown to the system attempting to render this text element, i.e. does not appear in its look-up tables. This could happen, for instance, in a purely German system, which has umlauts and underlining but no French-type accent marks.

At step 380 in FIG. 5, then, it is assumed that the entire text element $S_1c_1uc_2$ is not found, so the method goes to step 610 in FIG. 6. Proceeding to step 620, the subelement is set to the entire text element, because it includes no J's. Steps 630 and 650 are both false, and step 670 yields true, so at step 690 the subelement becomes $S_1c_1u$, and the $c_2$ is pushed onto a stack.

This subelement is also not in the table (step 710), and going back to step 670 it is determined that the subelement still contains at least one c. At step 690, the subelement is set to be the current subelement up to but not including the last c, which in this case is the unknown combining character u. (As discussed earlier, the parser 220 (FIG. 3) can determine the classification of the character u, even though the look-up tables may have no information about the proper glyph for u, because the classifications for all the encountered code points are stored in the tables 230.)

The subelement now consists of the string $S_1c_1$, and at step 700 the unknown character u is pushed onto the stack, which now has the form:

| Character Stack |
| --- |
| u |
| $c_2$ |

At step 710, assume that the remaining subelement $S_1c_1$ is found in the look-up tables 130, so at step 720 the combined glyph for $S_1c_1$ is added as the first element in the glyph list. The glyphs for the remaining combining characters are also appended to the glyph list (step 730), in this case the u and the $c_2$. The u should be given a blank default character while preserving its "combining" status, resulting in the combining of the known glyph for $c_2$ with the known glyph $S_1c_1$, for a combined glyph representing $S_1c_1c_2$. This results in the character ü being displayed, dropping the unknown code point for the accent.

If the combining classification of the unknown character (the accent) were either unknown or not preserved, the resulting display of ü would be ü__, i.e. u and umlaut combined, followed by a non-combining blank in lieu of the accent mark, with the underscore following the ü instead of combined with it (but combining with the preceding blank). Thus, the present system preserves as much of the original information as possible, including positional information, leaving out only as much information as is irretrievable.

This leads to another advantage of the system, namely that multitudes of different combined forms of letters and symbols need not be stored in the look-up tables. Because the present system is capable of combining characters at the time of rendering, many entries in the tables of combined characters can be dispensed with. This makes the system highly flexible without any added effort or memory expended in creating and storing tables. It also allows new characters, and characters from alphabets that do not exist in a standard code set such as Unicode, to be used.

Reordering the input text stream

When a text element is read by the system, it may not be in an order of characters that is recognized. Thus, in the above example the glyph ü may be stored in the look-up table as u ¨ __(u, umlaut, underscore), but it may appear in the input code point stream as u ¨ __(u, underscore, umlaut). In that case, the first order of code points would be located (in step 380 of FIG. 5), whereas the second would not.

To prevent this from happening needlessly, either the parser or the fallback handler preferably reorders the input code points into a preferred order. In this case, the system could ensure that the umlaut for a vowel immediately follows that vowel, and/or that all underscore code points are at the end of the text element. Either of these rules would, in this example, reorder u__ ¨ (u, underscore, umlaut) to u ¨ __(u, umlaut, underscore), and thus prevent the fallback handler from going through the procedure of steps 610 through 750.

Figure 7:
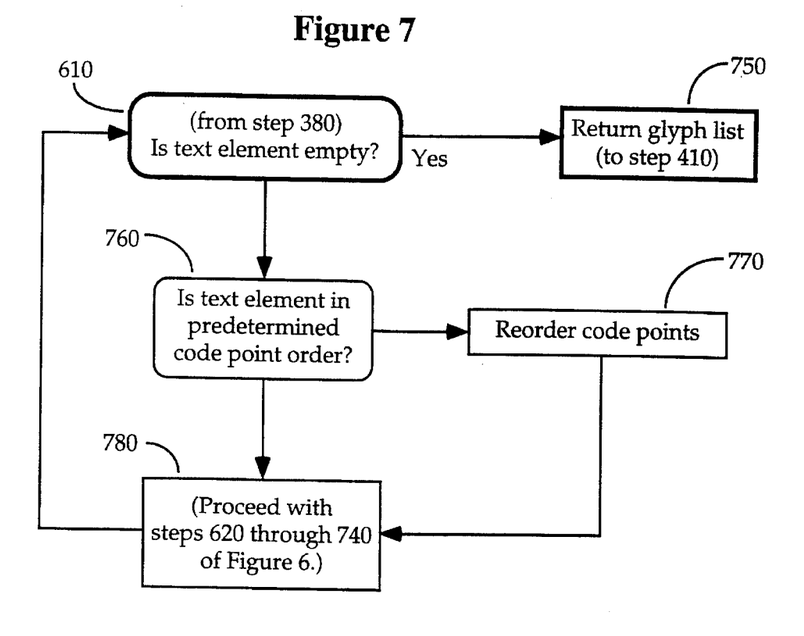
FIG. 7 is a flow chart of a modified form of FIG. 6.

Such a modification is shown in FIG. 7, where step 760 tests for whether the code points in a given text element are in a predetermined order. If they are not, they are reordered (step 770) before the text element is presented to the rest of the fallback procedure as at step 780.

Many different ordering schemes can be used, and the parser or fallback handler can be programmed to use them without affecting the code points or their classifications, and without affecting the definitions of the real expressions. This is an efficient way for handling unconventional input from systems other than the user's, and for accommodating new combinations of letters that may come along in the code standard; instead of regenerating the look-up tables, one simply modifies the parser or fallback handler.

EXAMPLE 3

$S_1c_1u_1u_2JUc_2JS_2$

Now consider a text element string in the above form, where the lowercase u's stand for unknown combining characters, and the other characters are defined as in the preceding example. In the normal classification notation of the invention, this is a text element of the form ScccJScJs, i.e. a spacing character followed by three combining characters, followed by a joined spacing character, followed by another combining character, followed finally by another joined spacing character.

While this example is a text element of highly unlikely complexity, it is useful here for illustration. By inspection, it is clear that the system should return $S_1c_1u_1u_2JUc_2JS_2 \Rightarrow <S_1c_1><\Box c_2><S_2>$ where the $<S_1c_1>$ is one combined glyph (because of the c) and the $<\Box c_2>$ is a joined glyph (because of the combining characteristic of the $c_2$). The default box ▢ is printed in lieu of the U, and the unknown combining characters $u_1$ and $u_2$ are dropped. The $S_2$ stands alone (the preceding J being dropped).

Referring to the method of FIG. 6, step 620 sets the subelement at $S_1c_1u_1u_2$, i.e. up to but not including the first J, and saves it as TEMP. Steps 630 and 650 are both negative, and step 670 is positive, so at step 690 the subelement becomes $S_1c_1u_1$ (the current subelement up to but not including the last c, i.e. the last combining character). That last combining character is $u_2$, and is pushed as the first element on the stack.

Step 710 is false, step 670 is still positive, so now the subelement becomes $S_1c_1$ (step 690), and the last combining character $u_1$ is pushed onto the stack (step 700), which now looks like:

| Character Stack |
| --- |
| $u_1$ |
| $u_2$ |

Assuming that a glyph for $S_1c_1$ is found in the look-up table for the given font (one of the tables 130 in FIG. 3), that glyph is stored in the glyph list at step 720, and the $u_1$ and $u_2$ are popped off the character stack and likewise added to the glyph list (step 730). The character stack is now empty, and the glyph list looks like:

| Glyph List |
|---|
| $S_1c_1$ |
| $u_1$ |
| $u_2$ |

At step 740, the TEMP string $S_1c_1u_1u_2$ and the immediately following J are removed from the original text element $S_1c_1u_1u_2JUc_2JS_2$, leaving only $Uc_2JS_2$ as the new "original" text element. Step 610 is false, so step 620 sets the subelement (and TEMP) at $Uc_2$. Steps 630 and 650 are both false, and step 670 is true, so step 690 sets the subelement at u, and step 700 pushes $c_2$ onto the (currently empty) character stack.

Step 710 yields a negative, as does step 670. At steps 680 and 730, the default box and the glyph code for $c_2$ are appended to the glyph list, which now looks like:

| Glyph List |
|---|
| $S_1c_1$ |
| $u_1$ |
| $u_2$ |
| ▫ |
| $c_2$ |

At step 740, the current value for TEMP ($Uc_2$) and the following J are now removed from the text element $Uc_2JS_2$, leaving $S_2$ as the new text element. Proceeding to step 610, the text element is still not empty, so at step 620(1)(b) the subelement is set to $S_2$ and at step 620(2) it is stored as TEMP. Step 630 is negative, and step 650 is positive, so step 660 adds the glyph for $S_2$ to the glyph list, which now includes:

| Glyph List |
|---|
| $S_1c_1$ |
| $u_1$ |
| $u_2$ |
| ▫ |
| $c_2$ |
| $S_2$ |

Now, at step 740 the value for TEMP ($S_2$) is removed from the original text element, which had itself been set at $S_2$, thus leaving an empty string. Step 610 is now positive. This returns the above glyph list to step 410 (of FIG. 5), where the glyphs are rendered and displayed. The $S_1c_1$ will be displayed together, followed by the default character (here, the box) combined with $c_2$, followed by the glyph for $S_2$. As before, no characters are displayed for the unknown combining characters, but they may be represented as blanks combined with the preceding glyph, since their combining classification is preserved.

Figure 8:
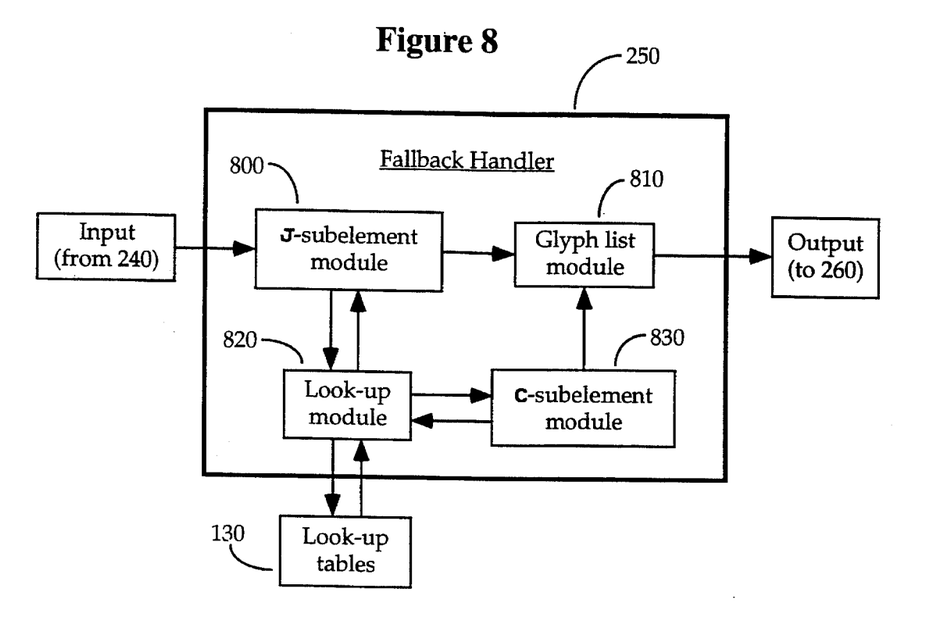
FIG. 8 is a block diagram of an embodiment of the fallback handler of the invention.

The fallback handler 250 shown in FIG. 3 is detailed in the block diagram of FIG. 8, and shows a suitable configuration for software to implement the method described above and depicted in the flow charts of FIGS. 6–7. The processing of subelements containing J's is handled by the J-subelement module 800, while subelements containing c's are processed by the module 830. Referring to FIG. 6, steps 620–650 and 740 could be implemented as software module 800, while steps 670, 690–710 and again 740 could be implemented as software module 830. The glyph list module 810 is controlled in turn by the J- and c-modules to generate and maintain the glyph list (steps 660, 720 and 730).

The modules 800 and 830 interact with a look-up module 820, which accesses the look-up tables 130 (compare FIG. 3) to search the tables for glyphs and retrieve them if they are found (see steps 650 and 710).

Any default glyphs are preferably generated (as in step 680) by a submodule within the relevant subelement module 800 or 830; for example, the J-module 800 may generate defaults representing null characters to substitute for joining characters, the c-module 830 may generate blank combining characters in place of unknown combining characters, and both may generate a box ▫ for unknown spacing characters. This may, of course, alternatively be handled in a separate default character generating module.

Once the procedure of FIG. 6 is executed, so that step 610 is true, the fallback handler 250 outputs the glyph list from the glyph list module 810 to the rendering module 260 (see FIG. 3).

EXAMPLE 4

$S_1J_1J_2S_2$

An example of an unusual situation that might be encountered is where two J's occur in a row; for instance, a letter that is always followed by a joining character in one alphabet might be followed by a letter from another alphabet that is always preceded by a joining character. At step 620, $S_1$ becomes the first subelement (and value for TEMP), and $J_1$ is stripped off (as in Example 1 above). At step 650, $S_1$ is found; at step 660 its glyph code is appended to the glyph list; and at step 740 $S_1$ and $J_1$ are removed from the string $S_1J_1J_2S_2$, leaving $J_2S_2$.

Proceeding back to step 610 (true) and then step 620(1), the subelement is now set at a null string (up to the "first J") and $J_2$ is stripped. The result in step 630 is positive, since the subelement is empty, so at step 640 the subelement (with its following $J_2$) is removed from the text element, leaving only $S_2$. The characters $S_1$ and $S_2$ are thus rendered in the normal fashion.

With the procedure of FIG. 6, many situations can be handled when the user's system does not have table information on the glyphs for given characters, and when an unusual or previously unknown combination of characters or character types is input as a text element. The types of situations that can be handled depend upon the predefined regular expressions, which here have been selected to resolve the above problems and that of maintaining large font tables.

Other fallback strategies might take into consideration the display characteristics for a particular output device. For example, if the output device is a PostScript laser printer, the fallback handler could use the PostScript operators to compose an approximation to the desired text element. The details of this strategy are too complex and machine-specific to describe in detail here. As an example, however, it might be very useful to map any text element of the form 7J/J8 (numeral, joiner, slash, joiner, numeral) into a fraction format whenever such a text element occurs. This would allow the generation of optimized fractions with any system, rather than only with mathematical editors.

By way of example, following is an outline of the steps of such a fallback strategy for a text element such as 7J/J8, which would map to a glyph for the fraction seven-eighths $$\left(\frac{7}{8}\right)$$

if such a glyph were available.

1. Reduce the font size by two-thirds.
2. Move to the upper half of the next cell.
3. Display the glyph for the first numeral (7).
4. Draw a horizontal line below the first numeral, (7).
5. Move to the bottom half of the cell.
6. Display the glyph for the second numeral (8).
7. Restore the font size.

Though many other approaches to this particular problem are possible, the point is that the fallback handler and the method of FIG. 5 allow this flexibility. With this approach, there need not be a table including thousands of possible fractions; any fraction can be generated when it is needed. Other sets of rules for different situations can be generated, and are especially useful where a particular form of output is desired (such as a fraction), with variable individual components of the output.

We claim:

1. A method executed in a computer system for generating glyphs, the method comprising the steps of:
    (1) determining whether a text element comprising a plurality of code points, each of said code points representing a glyph, has a first associated glyph in a table, said table associating a predefined set of one or more code points with a predefined set of one or more associated glyphs, said first associated glyph being one of said predefined set of associated glyphs;
    (2) outputting said first associated glyph when said text element has a first associated glyph;
    (3) modifying said text element if said text element does not have a first associated glyph, said modifying step comprising the steps of:
        (i) removing a predefined subset of the text element and including at least one code point to produce a modified text element; and
        (ii) generating a text element remainder comprising the predefined subset;
    (4) determining if said modified text element has a second associated glyph in the table;
    (5) determining if said text element remainder has a subsequent associated glyph;
    (6) outputting said second associated glyph and said subsequent associated glyph, respectively, if said modified text element has a second associated glyph, and if said text element remainder has a subsequent associated glyph.

2. The method of claim 1, wherein, if modified text element does not have a second associated glyph, the method further comprises the steps of:
    modifying said modified text element to produce another modified text element;
    determining step if said another modified text element has a third associated glyph;
    modifying said another modified text element if said another modified text element does not have a third associated glyph; and
    outputting said third associated glyph if said another modified text element is associated with a third associated glyph.

3. The method of claim 2, wherein said step of modifying said another modified text element includes the steps of:
    if a predetermined criterion is reached and an associated glyph is not located in the table for said another modified text element, generating a default glyph as the third associated glyph for said another modified text element.

4. The method of claim 3, wherein the predetermined criterion includes a determination that the text element is empty.

5. The method of claim 1, wherein the removed code point represents a joining character.

6. The method of claim 1, wherein the code point removed represents a combining character having no associated glyph in the table, and wherein the method further includes the step of:
    replacing the combining character with a default combining character if a text element includes a combining character with no associated glyph.

7. The method of claim 1 further comprising the step of:
    removing one or more code points each representing a control character from said text element and producing a filtered text element comprising only code points used in displaying glyphs.

8. The method of claim 1, wherein said predefined subset includes a code point representing an unknown character not having an associated glyph in said table.

9. The method of claim 1, further comprising the step of:
    outputting, for a text element in a font, more than one glyph wherein said text element comprises a code point representing a joining character and is associated with a single glyph for display on an output device in another font, said table indicating that said text element is not associated with a single glyph in said first font and indicating that said text element is associated with a single glyph in said second font.

10. The method of claim 1, wherein in response to determining if said text element remainder has a subsequent associated glyph, step 5 further comprises the steps of:
    (i) outputting said subsequent associated glyph if said text element remainder has a subsequent associated glyph; and
    (ii) modifying said text element remainder if said text element remainder does not have a subsequent associated glyph.

11. A method executed in a computer system for generating glyphs from an input stream of character codes, the method including the steps of:
    (1) generating a regular expression comprising an initial set of character codes from the input stream, the regular expression corresponding to a predefined syntax;
    (2) determining whether the regular expression is found in a look-up table, and if so, retrieving a glyph corresponding to the regular expression and proceeding to step 8, said look-up table used for associating a regular expression representing a predefined syntax with a glyph;
    (3) if a glyph associated with the regular expression is not found in the look-up table, generating a first subset of the initial set of character codes as a current subset, and a first remainder of the initial set of character codes as a current remainder, the first remainder of input character codes including at least one character code not included in the first subset;
    (4) determining whether a glyph is associated with the current subset of character codes using the look-up table, and if so, retrieving a glyph corresponding to the current subset and proceeding to step 7, and otherwise proceeding to step 5;

(5) generating a new subset of the character codes from the input stream as the current subset and a new remainder of the character codes from the input stream as the current remainder, the current remainder including at least one character code not included in the current subset;

(6) determining whether a predetermined criterion is met, and if not, returning to step 4, and if so, proceeding to step 7;

(7) if no occurrence of the current subset is associated with a glyph as specified in the look-up table, designating at least one default characters as a retrieved glyph and proceeding to step 8; and (8) outputting the retrieved glyph to an output device included in the computer system.

12. The method of claim 10, wherein:

step 3 further comprises the step of extracting a first code character from the initial set of character codes, the first extracted character constituting the first remainder;

each iteration of step 5 further comprises the step of extracting an additional character code from the set of character codes, wherein the current remainder comprises each said additional character code extracted with each said iteration of step 5; and the predetermined criterion of step 6 includes whether said initial set comprises a character code which has not been extracted from said initial set during an iteration of step 5.

13. The method of claim 11, wherein the predetermined criterion of step 6 includes whether all possible subsets of the initial set of character codes have been determined by said determining step 4 as not having being associated with a glyph using the look-up table.

14. The method of claim 11, wherein the predetermined criterion of step 6 includes whether there is a remainder subset comprising at least one character code, and if so, said determining step 4 has been executed twice.

15. The method of claim 11, including, after step 1 and before step 2, the step of reordering the character codes comprising the text element to a predetermined order.

16. A system for generating glyphs corresponding to a text element, the system including:

a look-up handler for searching a table to locate a correct glyph for the text element, said text element comprising a plurality of code points representing characters, each of said plurality of code points having a predetermined classification;

parser means for determining the predetermined classification of each of said plurality of code points and for communicating the predetermined classification of each of said plurality of code points to said look-up handler;

a fallback handler for processing the text element if a correct glyph for the text element is not located by the look-up handler, said fallback handler including:

i) first generating means for generating at least one subset of the code points comprising the text element;

ii) locating means for searching the table to locate a correct glyph for the subset; and iii) second generating means for generating a default glyph for the subset if the correct glyph for the subset is not located by the locating means;

the system further including input means for receiving each of said correct and default glyphs from said fallback handler; and output means for outputting each of said correct and default glyphs for display.

17. The system of claim 16, wherein:

one of said predetermined classifications corresponds to a joining code point indicating that a preceding code point and a following code point are to be represented by glyphs that are joined together.

18. The system of claim 17, wherein:

a first subset of the text element includes a code point for a first character followed, by a code point for a joining character, followed by a code point for a third character; and the second generating means includes means for generating a blank character replacing the joining character if a glyph for the first subset as a whole is not located in the table, and passing the code points for the first and third characters to the locating means for locating a glyph for each of the first and third characters separately for output by said outputting means.

19. The system of claim 17, wherein:

said subset of the text element includes a first code point for a first character, followed by a second code point for a second character, followed by a third code point for a third character, each of the second and third characters comprising a combining character, the first and third characters being represented in the table but the second character is not; and the second generating means includes means for passing the first and third code points for the first and third characters to the locating means for locating a first glyph for the first character and a second glyph for the third character, and for combining the first and second glyphs into a combined glyph representing the first and third characters, and for passing the combined glyph to said output means for outputting said combined glyph.

20. The system of claim 15, wherein the fallback handler includes means for reordering the code points of the text element before searching for said correct glyph.

* * * * *